April 7, 1970 TERUJI ISHII 3,504,525
APPARATUS FOR MEASURING THERMIC CHARACTERISTICS OF
EXTREMELY SMALL AMOUNTS OF TEST MATERIAL
Filed Nov. 30, 1965 2 Sheets-Sheet 1
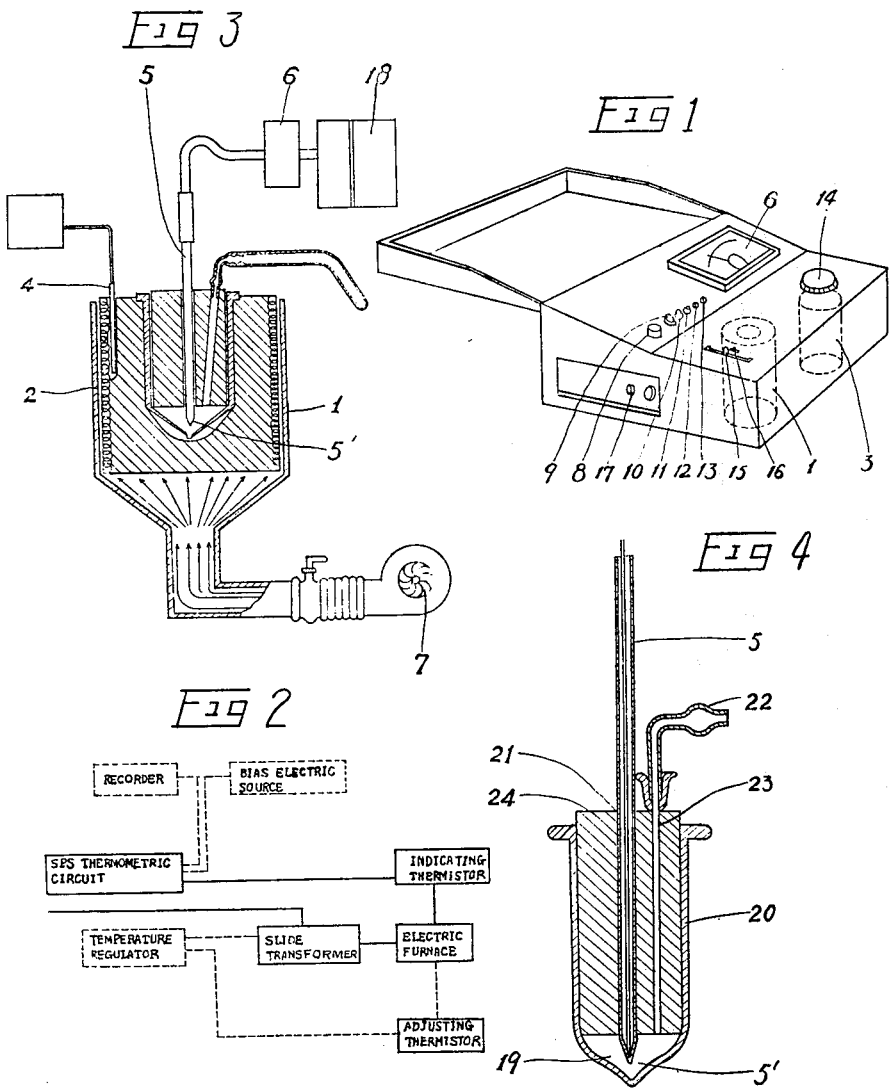
INVENTOR.
TERUJI ISHII
BY
ATTORNEY.

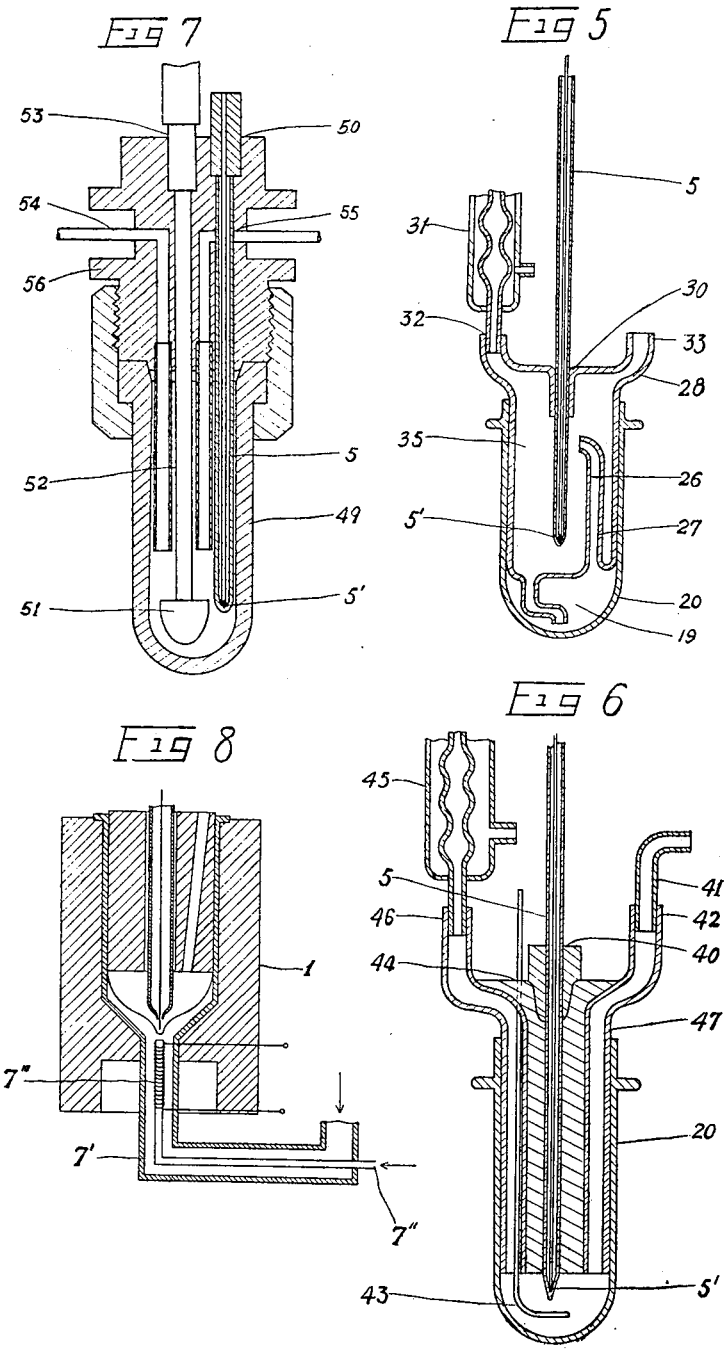

United States Patent Office 3,504,525
Patented Apr. 7, 1970

3,504,525
APPARATUS FOR MEASURING THERMIC CHARACTERISTICS OF EXTREMELY SMALL AMOUNTS OF TEST MATERIAL
Teruji Ishii, Tokyo, Japan, assignor to Cobble Company Limited, Tokyo, Japan
Continuation-in-part of application Ser. No. 356,911, Apr. 2, 1964. This application Nov. 30, 1965, Ser. No. 510,635
Claims priority, application Japan, Dec. 5, 1964, 39/68,374
Int. Cl. G01n 25/02
U.S. Cl. 73—17    1 Claim

ABSTRACT OF THE DISCLOSURE

An apparatus for measuring the thermal characteristics of extremely small amounts of test material. The apparatus comprises a plurality of test tubes having temperature measuring thermistors incorporated therein and which tubes are interchangeably fitted within a single apparatus that is adapted to note and record the temperature changes. The tubes are constructed such that melting, freezing and boiling points of the test materials, as well as temperatures of reaction and temperatures of reaction under pressure, can be determined by the use of the appropriate tubes within the apparatus.

---

This invention relates to an apparatus for measuring the thermic characteristics of an extremely small amount or volume of a test material. An extremely small amount or volume in this case means 0.5–100 mg. or 1–10 ml. respectively.

This is a continuation-in-part application to copending parent application S.N. 356,911, which claims the priority of Japanese application 38/16,429 of Apr. 4, 1963, and the priority dates to which the parent application is entitled are claimed for all subject matter common therewith. The parent application has matured into United States Patent No. 3,292,419, patented Dec. 20, 1966, for a "Melting Point Method and Apparatus."

The conventional methods for measuring thermic properties such as melting point and solidifying point consist of visual observation, a mechanical or optical observation or an observation based on thermodynamic equilibrium. In general, there are the capillary method and the heating plate method as observation methods by the naked eye. However, because of the results of measurement based on subjective differences due to various different conditions of different technicians by the naked eye, there occur such unavoidable irregularities in measured values that their reproducibility is poor and unsuitable for accurate measurement and moreover, in this kind of apparatus the measurement of solidifying point is unavailable. On the other hand, there are also various apparatuses of a mechanical or optical observation type but they are based on a two-point observation type in which separate observations of the time of melting and its temperature have to be made and therefore, some error is unavoidable due to differences in observation time. Furthermore, the temperature at the time of melting is identical with that of the furnace body so that the difference in temperature is present between the same and the test material and hence the observation of the material is nothing but subjective until some individual differences result therefrom and good reproducibility cannot be anticipated.

With reference to the observation method based on thermodynamic equilibrium, its principle consists in converting heat calories caused by phase variation in the test material into electric energy by means of a transducer, thereby measuring melting point and solidifying point from an equilibrium curve of temperature and time. Consequently, this method is most suitable for objective measurement. According to this method, a platinum resistant thermometer in the form of a transducer is inserted in the test material so that a curve of temperature and time of the material can be recorded automatically and then melting point and solidifying point be determined from such curve. However, this kind of apparatus requires large amounts of test materials as well as considerable time for measurement. While there is also an apparatus of this type using a thermistor designed mainly for measuring freezing point, the range of temperature measurement is very small and it requires relatively large amounts of test material as an apparent disadvantage so that it is found unsuitable for measuring a very small amount or volume of test material.

Also in the case of measuring boiling point, reaction temperature and also reaction temperatures of liquid and vapor phases of test material under pressure, individual measuring apparatuses are required, depending on measuring purposes and relatively large amounts of test material are also required so that the measurement of an extremely small amount or volume of test material is found difficult. Therefore, in the case of measuring the thermic properties of an extremely small amount or volume with a very accurate reproducibility, various difficulties and drawbacks are experienced.

In contrast, the present invention eliminates such inconvenient factors. According to the present invention, it is made possible, by means of one apparatus only, to measure the thermic properties of an extremely small amount or volume of a test material such as melting point, solidifying point, boiling point, reaction temperature and reaction temperatures of liquid and vapor phases of test material within wide ranges of measurement in a very rapid and accurate manner record the results automatically.

Namely, there are provided pipes of test material for exclusive use of an extremely small amount or volume of test material and said pipe is of a small volume and special bottom construction or inner construction and shape, each pipe being designed specifically according to measuring purposes, so that the thermic properties of an extremely small amount or volume of test material can be measured. Namely, by setting said pipe of test material in a temperature measuring apparatus proper, an apparatus is offered for measuring the thermic properties of an extremely small amount or volume of test material without resort to the naked eye for observation in an accurate manner showing an excellent reproducibility of the results and recording them in a rapid and simple manner. According to the required purposes of the present invention, there are provided a pipe capable of containing a small amount or volume of test material for measuring its melting point, solidifying point and boiling point, another pipe capable of containing a small amount of test material for measuring its boiling point, another pipe capable of containing a small amount of test material for measuring its reaction temperature and heat, and another pipe capable of containing a small amount of test material for measuring its reaction temperature and heat under pressure, all the pipes being set in a temperature measuring apparatus proper consisting of an electric furnace, a thermistor for adjusting temperatures of said electric furnace, another thermistor or thermocouple for temperature measurement, an electric meter for temperature measurement and a wind feed mechanism. Thus temperatures or variations in temperature resulting from the thermic changes in the test material due to heating by the electric furnace are detected by said temperature measuring thermistor or thermocouple, the temperature thus detected is indicated by said electric meter for temperature measurement and, the result is recorded automatically by means of a recording apparatus.

The invention will be explained in detail with reference to the accompanying drawings. FIG. 1 is a perspective view of a temperature measuring apparatus proper in which various pipes capable of containing an extremely small amount or volume of a test material for measuring purposes are disposed, which apparatus is capable of measuring the thermic properties of the test material in said pipes. FIG. 2 is a block diagram of the temperature measuring apparatus proper in the case an indicating thermistor is used. FIG. 3 is a principal view of the present apparatus with a pipe of test material for measuring its melting point being set in the main body of the apparatus. FIGS. 4, 5, 6, and 7 show embodiments of various pipes of test material which are used after set in the temperature measuring apparatus proper and prepared according to the respective measuring purposes. Namely, FIG. 4 is a vertical view in section of a pipe for test material for measuring the melting point of an extremely small amount of test material. FIG. 5 is a vertical view in section of a pipe of test material of a volume between 1 and 10 ml. for measuring its boiling point. FIG 6 is a vertical view in section of a pipe for test material of a volume between 1 and 10 ml. for measuring its reaction temperature and heat. FIG. 7 is a vertical view in section of a pipe for test material of a volume between 1 and 10 ml. for measuring its reaction temperature and heat under pressure. FIG. 8 is a conceptional view of an apparatus for feeding heated air and cool air beneath an electric furnace in the case of measurement using a thermocouple in the present temperature measuring apparatus proper.

According to the method of the present invention, there are provided various pipes of test material, according to their respective measuring purposes, for measuring the melting point, solidifying point and boiling point of an extremely small amount of test material and measuring the reaction temperature of a small volume of test material and the reaction temperature and heat of the same under pressure. These pipes are set accordingly in the temperature measuring apparatus proper so that the temperature of test material or variations in temperature due to heating or cooling can be measured. The temperature measuring apparatus proper in which each pipe of test material can be in common use is of such a construction as follows. Namely, it consists mainly of an electric furnace 1, an electric heater 2 as its heating source, a slidac 3, a thermistor 4 for adjusting the temperature of electric furnace, another thermistor of thermocouple 5 capable of being inserted and fixed in the pipe of test material for measuring the temperature of test material, an electric meter 6 for temperature measurement and a wind fan apparatus 7, and still more it is provided with various switches for operation of said elements such as a switch 8 for electric meter, a range switch 9, a meter adjuster 10, a source switch 11, heater switches 12 and 13, a slidac knob 14, a wind feeding lever 15 to adjust said wind fan apparatus 7, a wind exhaust lever 16 and an output shift switch 17. Next, the abovementioned pipes for test material for measuring the temperature of an extremely small amount or volume of test material will be explained one by one with reference to their embodiments as follows:

(a) FIG. 4 shows a pipe for test material for use in combination with the temperature measuring apparatus proper in the case of measuring the melting point, solidifying point and boiling point of an extremely small amount of test material. This pipe for test material consists of a heat-light glass container 20 equipped with a chamber 19 of test material at the lower end thereof, a cylindrical inner pipe 24 having an insertion hole 21 for a thermistor of temperature measurement, a feed-pipe 22 for inactive gas and a piercing hole 23 for insertion of the same being inserted in said glass container 20. By the use of said pipe of test material, the measurement of melting point, solidifying point or boiling point of an extremely small amount of test material can be carried out in the following manner. First of all, a test material, 0.5–10 mg. is put in said chamber 19 and, according to necessity, especially when the amount of test material is 0.5–10 mg., non-adsorbent or almost non-adsorbent inorganic particles such as quartz or gold powder of a good heat conductivity are mixed with the test material in an amount equal to or double that of the test material. Subsequently, the thermistor 5 is inserted in the hole 21 for fixation and the cylindrical inner pipe 24 consisting of the feed-pipe 22 for inactive gas (nitrogen gas) inserted into the piercing hole 23 is inserted into said glass container 20. In this case, a bead portion 5' of the thermistor 5 is embedded in said test material for fixation in a definite position. The pipe of test material thus assembled is set in the electric furnace 1 of the temperature measuring apparatus proper and said pipe is heated by the electric furnace. On heating, the test material is melted and the heat absorbing temperature and its variations are detected by the thermistor 5 for temperature measurement and indicated by the electric meter 6 for temperature measurement. If necessary, the recorder 18 may be connected to said meter 6 whereby the curves of melting, solidifying and boiling can be recorded automatically. Furthermore, a bias electric source is connected thereto so that a portion of any arbitrary temperature can be magnified 10 times as large for recording. Also in the case of measuring its solidifying point, electric voltage for the electric heater 2 can be interrupted by operating the knob 14 of the slidac 3 and the temperature is lowered rapidly by operating the wind feeding lever 15 of wind feeding apparatus 7 so that the electric furnace can be cooled and the temperature of test material at the time of its solidification can be detected by the thermistor 5 for temperature measurement and the result be indicated by the electric meter 6 for temperature measurement. According to the present method, the limits for temperature measurement are as broad as −5°∼350° C. for measuring purposes. In case the test material is easily decomposed, nitrogen gas may be supplied into the pipe through the feed pipe 22 and then such decomposition may be prevented by carrying out the operation in said atmosphere.

(b) FIG. 5 shows a pipe for test material for measuring its boiling point. Here is shown a cylindrical heat-tight glass container 20 with the formation of a circular bottom, into which a cylindrical slit glass plug 28 is inserted, said plug being provided with an inlet 30 for insertion of the thermistor 5 for measuring the temperature of test material in the central portion of the upper surface thereof, an opening 32 for connection to a cooler 31 and an insertion opening 33 for connection to a fractional distillator capable of distilling the test material if necessary and separate walls 26 and 27 partitioning the chamber 19 of test material and a vapor chamber 35. Subsequently, the measuring procedure will be explained hereinafter. A test material (1–10 ml.) is put in said cylindrical heat-tight glass container 20 with a circular bottom into which the slit glass plug 28 of said construction is inserted, said glass container 20 is set in the electric furnace 1 of the temperature measuring apparatus proper and then the thermistor 5 for temperature measurement is inserted therein through the insertion inlet 30 for fixation. Next, the cooler 31 is connected to the connection opening 32 and heated by the electric furnace 1. When the test material is boiled until it refluxes continuously, a double point of liquid and vapor phases forms at this time, i.e., the temperature of boiling point is detected by the thermistor 5 for temperature measurement, the result thereof is indicated by the electric meter 6 and then recorded by the recorder 18 automatically. When a bias electric source is connected thereto, if necessary, a portion of any arbitrary temperature can be magnified 10 times as large for recording.

(c) FIG. 6 shows a pipe for measuring the reaction temperature of a small volume of test material. Here is shown a cylindrical heat-tight glass container with the formation of a circular bottom, into which the slit glass plug 47 is inserted, said plug being provided with an inlet 40 for insertion of the thermistor 5 for temperature measurement, an opening 42 for insertion of the end portion of a guide-in pipe 41 for inactive gas, a piercing hole 44 for insertion of a stirring lever 43 and an opening 46 for connection to the cooler 45. The procedure of measuring the temperature of the present reaction will be explained hereinafter. A reaction material, dissolved in a solvent if necessary, is put in said cylindrical heat-tight glass container 20 with a circular bottom into which the slit glass plug 47 of said construction is inserted. This container 20 is set in the electric furnace 1 of the temperature measuring apparatus proper in which the thermistor 5 for temperature measurement is inserted through the inlet 40 and then the cooler 45 is connected thereto through the opening 46. It is then heated gradually by the electric furnace 1, nitrogen gas, if necessary, is guided in while keeping the temperature at a constant level and a reacting material is added to the test material in an amount equal to or 1.5 times as much as the latter so that the test material can be reacted by stirring action of the stirrer 43 in the atmosphere of nitrogen gas, if-necessary. By this means, a temperature most suitable for causing this reaction is imparted to the reaction pipe. The temperature and variations in temperature for heating or heat absorption of the test material are detected by the bead portion 5' at the end of the thermistor 5 for temperature at this time, indicated by means of the electric meter for temperature measurement, and, if necessary, connected to the recorder 18 for recording.

(d) FIG. 7 shows a pipe for measuring the reaction temperature of vapor or liquid phase of a small volume of test material under pressure (below 300 atmospheric pressure). Here is shown a cylindrical stainless container 49 of a thick wall with a circular bottom in which a plug body 56 is inserted, said plug body being provided with a thermistor 5 covered by stainless steel previously inserted therein for fixation, an inlet 53 for insertion of a stirring lever 52 having a spring 51 at the lower end thereof, and two gas guide-in pipes 54 and 55. Next, the procedure of measuring the reaction temperature of a small volume of test material under pressure will be explained with reference to one embodiment in the case of reduction by hydrogen. A test material, 10 ml., if necessary, is dissolved in a solvent or if further necessary, a catalyst (e.g., Raney nickel) is put in said stainless container 49 with the air-tight insertion therein of the plug body 56 of said construction and said stainless container is set in the electric furnace 1. Then, while gradually heating and stirring the test material by means of the spring 51 of the stirrer 52 under pressure, hydrogen gas is guided in through the gas guide-in pipe 54 or 55 for reduction of the material. The reaction temperature in this case is detected by the thermistor 5 for temperature measurement, indicated by the electric meter 6 and recorded by the recorder 18. In the case of causing the reaction of vapor phase of the test material, the stirrer 52 is removed and instead, a net containing a catalyst is put herein so that gas reaction can be effected in the presence of such catalyst and the reaction temperature of test material under pressure be detected by the thermistor 5 for temperature measurement, indicated by the electric meter 6 and then recorded by the recorder 18. Moreover, according to the present method, it is imperative that said container 49 and said plug body 56 should be in air-tight contact in order that gas may not leak out during the period of reaction. The limit of pressure of the present method is up to 300 times atmospheric pressure.

As for the present temperature measuring apparatus proper and various pipes of test material to be set therein, it is possible to use a thermocouple instead of a thermistor for temperature measuring purposes. In this case, designation 5 of accompanying drawings shows the thermocouple. Especially in the case of measuring the melting point, solidfying point and boiling point of an extremely small amount of test material, beneath the electric furnace as shown in FIG. 8, there is provided a hot or cool wind feeding apparatus consisting of an air guide-in pipe 7' equipped with a guide-in hole 7" for Freon gas for cooling purposes and a heater 7''' so that cool or hot wind can be supplied directly to the circumferential surface of bottom of the pipes of test material. At the time of the measuring operation, the thermocouple is inserted in the pipe of test material in such a manner that the lower portion of said thermocouple can be embedded in an extremely small amount (e.g., 0.5 mg.) of test material put in the chamber of pipe of test material which has been set in said electric furnace.

Thus, at the time of measuring the melting point or boiling point, the bottom of the pipe of test material is heated by heated wind abruptly and at the time of measuring the solidifying point, it is cooled by cool wind abruptly so that the thermocouple 5 can sense the temperature of the test material at its melting point, the temperature of the solidifying point and also the temperature of the same at the time of boiling.

According to the present method for measuring the thermic properties of an extremely small amount of test material or a small volume of the same, there are provided various pipes for exclusive use with an extremely small amount or a small volume of test material as prepared for different measuring purposes and all these pipes are set in one temperature measuring apparatus. Therefore, with a single apparatus of this kind and only by replacing each pipe of test material therein depending upon each measuring purpose, it is made possible to measure the melting point, solidifying point and boiling point of even an extremely small amount of test material, moreover the reaction temperature of even a small volume of test material and also the reaction temperature of both vapor and liquid phases of the same under pressure in an accurate manner and easily in a short period of time without resort to observation by the naked eye. If necessary, it is also possible to connect a recorder of slight temperatures to this apparatus so that a portion of any arbitrary temperature can be magnified 10 times as large for recording slight variations in temperature. The reproducibility of the present apparatus is quite remarkable, being $\pm 0.05°$ C. The range of the meters in use is designed so that the limits of temperature are very large ($-5° \sim 350°$ C.). There are also provided two thermistors for temperature measurement, one for low temperatures and the other for high temperatures respectively and a thermocouple may also be available for application. In the case of treating a test material which is easily decomposed in the air, the treatment can be conducted in the presence of nitrogen gas in order to prevent such decomposition. It is also made very easy to apply a test material to each pipe of test material thus offering a very convenient advantage in the measuring procedures. In conclusion, therefore, the present apparatus finds extensive uses in the measurement of material qualities, technical studies, for example, thermal analysis, measurement of reaction rates, measurement of molecular weights, quantitative analysis and so forth.

What is claimed is:

1. An apparatus for measuring the thermic properties of an extremely small amount of test material, comprising a pipe means for test material, said pipe means comprising a container (20) having a converging lower end, a plug (28) inserted fittingly therein, said plug (28) enclosing with is walls a first vapor chamber means (35) and forming with the lower end of the container (20), a second test material chamber means (19), reflux means in the part of said plug (28) bounding the test material chamber (19) in order to place the vapor chamber (35) in reflux communication with the test material chamber (19) with said reflux means being the sole means of communication between the first vapor chamber means and the second test material chamber means, said plug body (28) having a hole (30) for insertion of a thermistor into the vapor chamber (35) for temperature measurement, a cooler means (31) attached to said plug (28) in communication with the vapor chamber (35), means to provide a controlled temperature on the exterior of said pipe means, means to support said pipe exchangeable in said temperature means, and means to measure the temperature of the test material.

References Cited

UNITED STATES PATENTS

| | | | |
|---|---|---|---|
| 1,443,537 | 1/1923 | Hortvet | 73—17 |
| 3,053,074 | 9/1962 | Walker et al. | 73—17 |
| 2,252,750 | 8/1941 | Basch | 73—51 |
| 2,595,386 | 5/1952 | Kojola | 73—17 |
| 3,187,556 | 6/1965 | Ehlers | 73—17 |
| 3,267,728 | 8/1966 | Solomons | 73—190 |
| 3,283,560 | 11/1966 | Harden et al. | 73—15 |
| 3,292,419 | 12/1966 | Ishii | 73—17 |

RICHARD C. QUEISSER, Primary Examiner

J. WHALEN, Assistant Examiner